United States Patent
Wood et al.

(10) Patent No.: US 6,337,114 B1
(45) Date of Patent: *Jan. 8, 2002

(54) FLEXIBLE LINING WITH FLEXIBLE COLLAR FOR LINING LATERAL PIPELINES

(75) Inventors: Eric Wood, deceased, late of Castletown; Miranda Jane Bull, legal representative, Peel, both of (GB)

(73) Assignee: Insituform (Netherlands) B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/941,605

(22) Filed: Sep. 30, 1997

Related U.S. Application Data

(62) Division of application No. 08/599,045, filed on Feb. 9, 1996, now Pat. No. 5,975,878, which is a division of application No. 08/394,622, filed on Feb. 27, 1995, now Pat. No. 5,624,629, which is a continuation of application No. 07/934,678, filed on Sep. 10, 1992, now Pat. No. 5,393,481.

(51) Int. Cl.$^7$ .......................... B29C 63/34; B29C 63/36
(52) U.S. Cl. .......................... 428/36.9; 138/97; 138/98; 156/294
(58) Field of Search .............. 428/36.8, 36.9; 138/97, 98; 128/36.91

(56) References Cited

U.S. PATENT DOCUMENTS

| | | | |
|---|---|---|---|
| 4,208,373 A | 6/1980 | Matovich | 138/109 |
| 4,434,115 A | 2/1984 | Chick | 264/36 |
| 4,496,499 A | 1/1985 | Brittain et al. | 264/36 |
| 4,582,092 A | 4/1986 | Nissen | 138/109 |
| 4,602,974 A | 7/1986 | Wood | 156/287 |
| 4,724,108 A | 2/1988 | Jurgenlohmann et al. | 264/269 |
| 4,778,553 A | 10/1988 | Wood | 156/287 |
| 4,786,345 A | 11/1988 | Wood | 156/156 |
| 4,980,116 A | 12/1990 | Driver | 264/269 |
| 5,108,533 A | * 4/1992 | Long, Jr. et al. | 156/294 |
| 5,167,901 A | 12/1992 | Driver et al. | 264/516 |
| 5,223,189 A | 6/1993 | Friedrich | 264/269 |
| 5,329,063 A | * 7/1994 | Endoh | 138/98 |
| 5,384,086 A | 1/1995 | Smith | 156/294 |
| 5,454,401 A | 10/1995 | Kamiyama et al. | 156/287 |
| 5,692,543 A | * 12/1997 | Wood | 138/98 |

FOREIGN PATENT DOCUMENTS

| | | | |
|---|---|---|---|
| DE | 254 055 | 2/1988 | 285/55 |
| EP | 0241719 | 10/1987 | |
| GB | 2082285 | 3/1982 | |
| GB | 2096265 | 10/1982 | |
| JP | 4-355116 | 12/1992 | 264/269 |
| WO | WO 8503758 | 8/1985 | |
| WO | WO 8908218 | 9/1989 | |

* cited by examiner

*Primary Examiner*—Harold Pyon
*Assistant Examiner*—Sandra M. Nolan
(74) *Attorney, Agent, or Firm*—Cowan, Liebowitz & Latman, P.C.; Michael I. Wolfson; Lloyd G. Buchanan

(57) ABSTRACT

A flexible liner resin impregnable for lining a lateral pipe which leads into a main pipe having at one end a flexible collar for installation at the location where the lateral liner meets the main, wherein after installation the collar extends along the interior of the main seating against the opening of the lateral. The flexible liner is installed by everting the liner through the opening in the collar by means of fluid under pressure supplied to a launching device which is held in position by an inflatable bladder and seals the collar at the lateral main pipe junction.

4 Claims, 2 Drawing Sheets

FLEXIBLE LINING WITH FLEXIBLE COLLAR FOR LINING LATERAL PIPELINES

This is a divisional of application Ser. No. 08/599,045 filed Feb. 9, 1996 now U.S. Pat. No. 5,975,878, issued Nov. 2, 1998 which is a divisional of Ser. No. 08/394,622, filed Feb. 27, 1995, now U.S. Pat. No. 5,624,629 issued on Apr. 29, 1997, which is a continuation of Ser. No. 07/934,678, filed Sep. 10, 1992, now U.S. Pat. No. 5,393,481 issued on Feb. 28, 1995.

BACKGROUND OF THE INVENTION

This invention relates to the lining of pipelines or passageways, using flexible tubular materials which are impregnated with curable synthetic resin and which, when placed in position lining the pipeline or passageway are held by fluid pressure against the pipeline or passageway surface until the resin cures to a hard condition leaving a hard lining pipe lying on the pipeline or passageway surface.

The most widely practised method using such resin impregnated linings is disclosed in British Patent No. 1449455 from which it will be seen that the impregnated lining is applied to the pipeline or passageway surface by eversion of same into the pipeline or passageway, using fluid pressure.

The present invention is concerned with lining pipelines which are called "laterals" insofar as they enter sidewise a main pipeline or passageway, such as a main sewer. Of any particular main line, there may be a plurality of laterals entering the main line, and it frequently arises that the laterals have to be lined by means of a resin impregnated tube. Using existing methods for lining laterals, it is not possible to perform any lining operation of a second or subsequent lateral whilst the lining in one lateral is being cured. As the cure time may take up to 5 or 6 hours, if a section of main line having say 5 laterals to be lined is involved, the minimum total time to line all laterals will be in the order of 25 to 30 hours. As these lining operations are required to be carried out during the night for purposes of convenience, it is often the case that the completion of the work has to take place over several evenings and therefore the work crew must depart the site and return at a later date to complete the work.

The present invention is concerned with providing an arrangement wherein the completion of a plurality of lateral lining operations may be effected in a much shorter period.

SUMMARY OF THE INVENTION

In accordance with the present invention, a plurality of laterals meeting a common main line are lined by inserting resin impregnated linings into said laterals and to hold same in position by fluid pressure whilst curing of the resin takes place, and after insertion of each lining, a seal arrangement at the location where the lateral meets the main line enables the second and subsequent laterals to be lined whilst the first or previously inserted lining is held in position and is being cured.

The seal arrangement may comprise a flexible bag which is pressurised with the medium which urges the lining against the lateral surface so as to prevent escape of the pressurising medium, but such bag allowing pressure fluid supplying pipes to pass to the inside or outside of the bag and to other lateral connections downstream of the bag in the main pipe whereby such other laterals may be lined by the eversion there into of a resin impregnated lining tube, the holding of the lining tube to the lateral surface being affected by fluid pressure, and a sealing bag retaining the lining in position and forming a seal between the lateral and the main line.

It will be seen that by using the method, the linings for the laterals can be inserted sequentially, and held in installed position under pressure, and cured simultaneously. A plurality of laterals can be lined and cured in a total time equal to the time it takes to line one lateral multiplied by the number of laterals plus the curing time for one of the lateral linings which total time in the case of 5 laterals may be in the order of 8 hours, which is a considerable reduction from the 25–30 hours which are required for the lining of 5 laterals by the conventional method. For example therefore the lateral lining on any particular contract may be capable of being completed in one evening as opposed to being completed in stages over two or three evenings.

BRIEF DESCRIPTION OF THE DRAWINGS

Embodiments of the invention will now be described, by way of example, with reference to the accompanying diagrammatic drawings, wherein.

DESCRIPTION OF THE PREFERRED EMBODIMENT

Figures 1, 2, 3, 4:
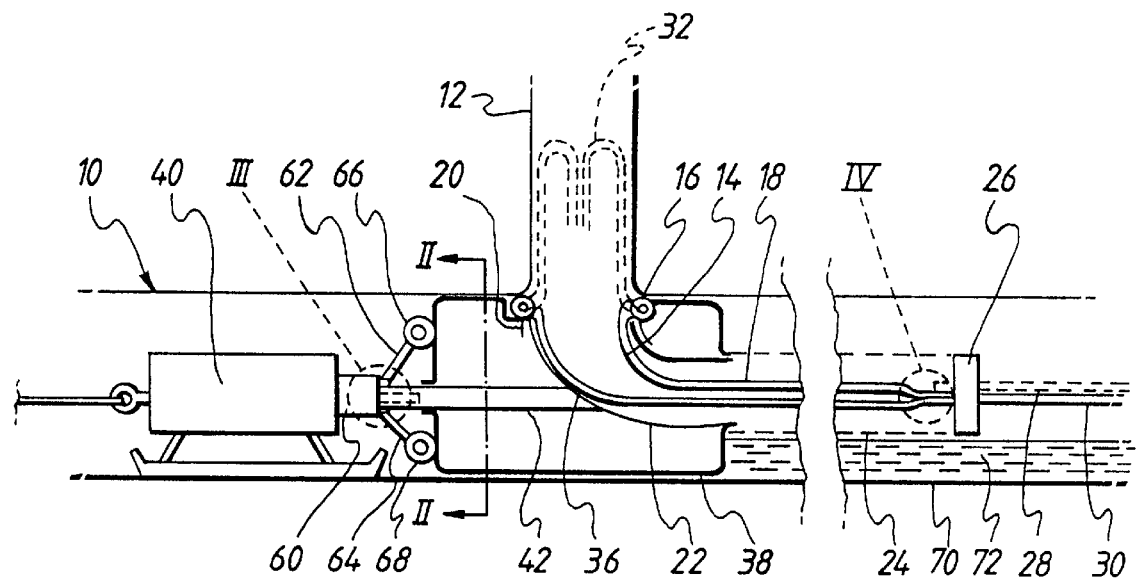
FIG. 1 is a diagrammatic side elevation showing the method by which a lateral is lined in accordance with the method of the invention.
FIG. 2 is a sectional elevation taken on the line II—II.
FIG. 3 is an enlarged sectional view of the detail ringed III in FIG. 1.
FIG. 4 is an enlarged sectional view of the detail ringed IV in FIG. 1.

Referring to the drawings, in FIG. 1 a main line 10 is intersected by a lateral 12 which is to be lined in accordance with a first method of the invention.

For the lining operation, a resin impregnated flexible lining tube 14 has a beaded end 16 which is reinforced, and forms a ring which seats against the opening of the lateral 12. The tube 14 is loaded inside a carrier tube 18. Carrier tube 18 has one end 20 anchored to an elbow pipe 22, and to the other end of the elbow 22 is connected a containment tube 24. A disc 26 seals the other end of the containment tube, but extending through the disc is a pressure hose 28 and a bleed hose 30.

The pressure hose 28 and bleed hose 30 can slide through the disc 26 as insertion of the lining tube 14 takes place as will be explained.

If reference is made now to FIG. 4, as shown, the tail end of the carrier tube 18 is closed around the bleed hose 30, and the pressure hose 28 is connected to the closed end of the carrier tube 18. The end of the lining tube 14 stops short of the end of the carrier tube so that the lining tube can be left in position lining the lateral 12.

The method of insertion comprises the introduction of pressurising fluid, water or gas, through the pressure hose 28 into the space between the containment tube 24 and the carrier tube 18 with the result that the carrier tube 18 and the lining tube 14 are everted as shown at 32 in FIG. 1 into the lateral 12, the lining tube 14 being presented to the lateral surface. The assembly of tubes 14 and 18 therefore everts into the lateral 12 and the pressure hose 28 and the bleed hose 30 are pulled through the containment tube, through the elbow 22 and up to the top end of the lateral. The portion 30A of the bleed hose projects out of the end of the eversion face so that if any water collects above the lining, it can bleed through end 30A, which is provided with apertures 34 for this purpose, out of the tube 30 and back to drain so that there will be no undesirable collection of liquid in the lateral whilst lining is taking place.

The pressure fluid which is supplied by the hose 28 leaks through an aperture 36 in the elbow 22 and pressurises a bag or bladder 38 surrounding the elbow as shown. The bladder is therefore inflated so as to seal against the main line 10 and to seal the end 16 of the lining. The aperture is provided with or acts as a pressure reduction means so that whilst the everting pressure may be of the order of 20 p.s.i., the pressure in the bag or bladder 38 is much lower e.g. in the order of 5 p.s.i. The bladder 38 remains pressurised as long as the pressure is maintained inside the everted lining and carrier tube. As soon as this position has been reached, a towing assembly 40 which is used for positioning the elbow 22 by being connected thereto through a link 42 fast with elbow 22, is released from that link insofar as, as shown in FIG. 3, the link 42 has a socket 44 in which engages a centralising pin 46. The wall of the socket 44 has aligned apertures 48, 50 in which pegs 52 and 54 engage, these pegs being carried by pivotable jaws 56 and 58. The jaws 56 and 58 are connected to the clamping device 60 having swingable arms 62 and 64 on the ends of which are provided guide rollers 66 and 68. As the bladder 38 inflates, the rollers 66 which are held inwardly by spring action are caused to pivot to the position shown in FIG. 1 which has the effect of moving the jaws 56 and 58 apart to remove the pegs 52 and 54 from the apertures 48 and 50 and the positioning device 40 and the device 60 with the rollers and jaws can be detached from the bladder and the connecting tube 42 so that it can be pulled along the line 10 away from the inflated bladder.

A series of additional pressure pipes and corresponding bleed pipes 70, 72 (four in all) extend to the outside of the bladder 38 and are removably attached to the positioning device 40. Device 40 is moved to the other end of the main line 10 and a second assembly comprising elbow 22, bladder 38, containment tube 24, sealing disc 26 and the carrier tube and lining 18 and 14 with bladder 38 is connected to the positioning device (and one of the additional pressure/bleed pipe pair) which is again moved back into the main line 10 until the next lateral to be lined is reached when the device is placed in register therewith so that by appropriate pressurising of the assembly as described in relation to FIG. 1, the lining tube can be inserted into position in the lateral. When this process has been completed, the procedure is again repeated so that all five laterals can have lining tubes placed therein and the lining tubes can be cured simultaneously.

To effect the curing, it may be necessary to circulate hot water, steam or hot air through the pressurising hoses 28, 70 and 72 if the resin is of the heat cure type.

When curing has been completed, it is simply a matter of releasing the pressure in each of the bladders 38 which will then collapse, and each can be removed from the main line 10 by pulling on the pressure hose 28, 70 or 72 as the case may be. The restriction of such hose retracts the carrier tube 18 from inside the lateral, leaving the rigid lining tube 14 in position.

Figure 6:
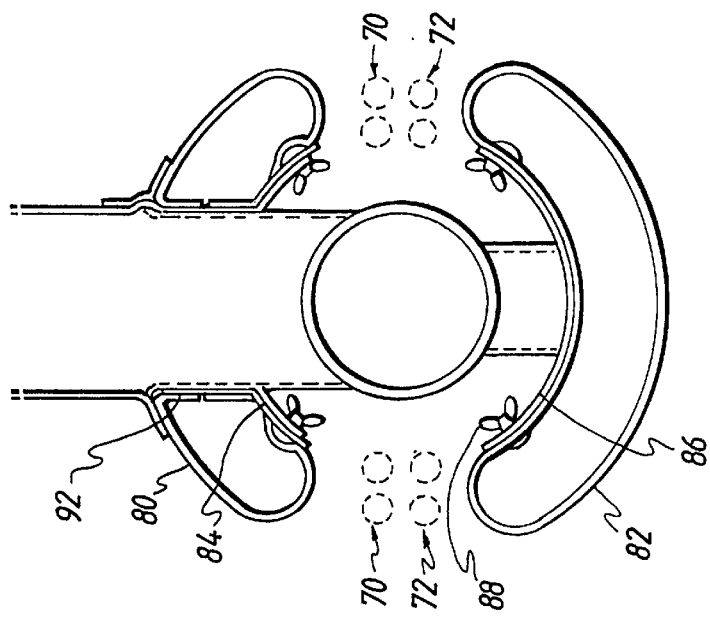
FIG. 6 is an end view of the arrangement shown in FIG. 5.
Figure 7:
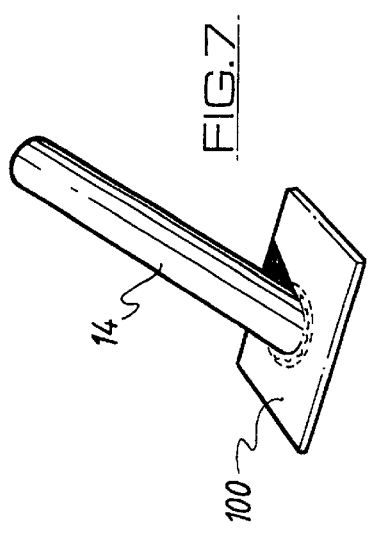
FIG. 7 is a perspective view of the lining tube used in the method of FIGS. 5 and 6.
Figure 5:
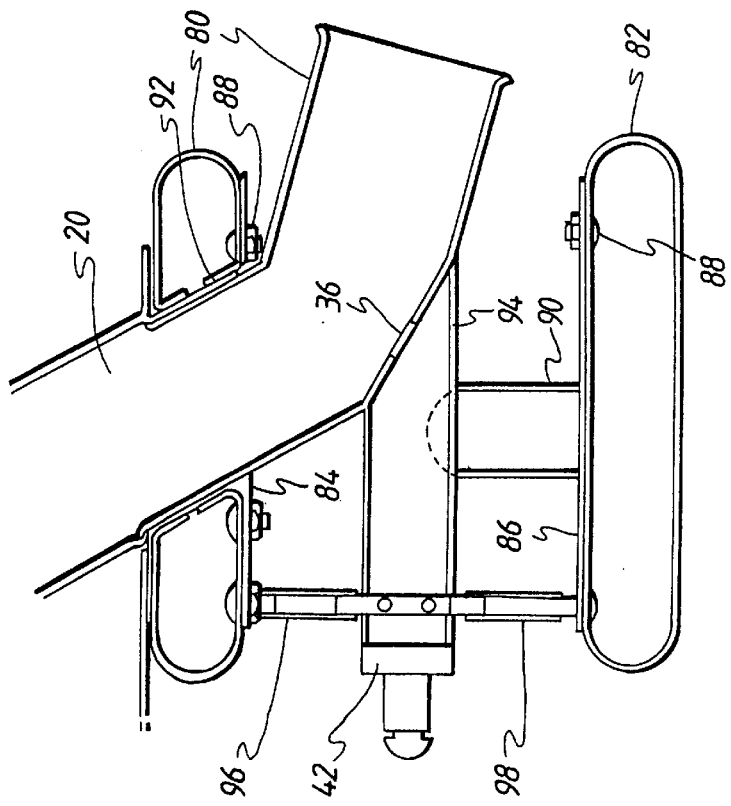
FIG. 5 is a sectional side view of an alternative form of apparatus for carrying out the method of the invention.

In the alternative arrangement shown in FIGS. 5, 6, and 7, the method of operation is the same as that described in relation to FIGS. 1–4, and only the structure of the bladder is varied in order to make it easier for the additional pressure/bleed pipes to pass the bladder assembly whilst it is inflated.

Thus, the bladder is in the form of diametrically opposite inflatable pillows 80, 82 which are carried on inner diametrically opposite plates, 84, 86 connected to the elbow 22 by being bolted thereto by bolts 88. Plate 86 is carried by the elbow 22 on a radial leg 90 which is adjustable in length so that the arrangement can be adjusted to suit pipes of different diameters. Pillow 80 has a hole, 92 therein through which the elbow pipe 22 passes the pipe 94 which extends from the elbow 22 forms passage for the everting medium and also carries the coupling 42. Pipes 96, 98 connect the interior of the pipe 94 and the pillows 80, 82. The aperture 36 is also shown in FIG. 5. The operation of the arrangement of FIGS. 5, 6 and 7 will be understood from the previous description of the embodiment of FIGS. 1–4. The lining 14 and the carrier tube 18 are inverted by pressurising the interior of elbow 22 and at the same time by passage of the pressurising medium through hole 36, pipe 94, and pipes 96, 98 inflation of the pillows 80, 82 to seal the lateral aperture whilst eversion takes place. The additional pressure/bleed pipes 70, 72 can pass between the pillows easily as shown in FIG. 6 in dotted lines. Whilst pillow 80 seals the lateral, pillow 82 forms a reaction means.

The lining tube 14 in the FIG. 7 arrangement as shown has a collar 100 which is preferably a sealed envelope containing a resin absorbent material which is impregnated with curable synthetic resin similar to the tube itself. As the lining tube 14 cures so the collar will also cure and the collar remains in place around the lateral aperture.

The present invention provides a system whereby a plurality of lateral linings may be cured simultaneously thereby reducing the overall cure time in a contract where a number of laterals have to be lined.

What is claimed is:

1. A liner of resin absorbent material for lining a lateral passageway connected to a main passageway, comprising:
   a lining tube of resin absorbable flexible material formed with a lumen conforming to the dimensions of the lateral having a collar of resin absorbable flexible material adapted to conform to the interior surface of the main passageway around the lateral aperture for forming an improved seal at the junction between the main pipeline and the lateral, wherein the tube and the collar are both resin impregnable.

2. The liner of claim 1, wherein the resin absorbable material of the tube is impregnated with curable resin and the resin absorbable material of the collar is impregnated with curable resin.

3. The liner of claim 2, wherein the resin in the tube and the resin in the collar are cured at the same time.

4. A liner of resin absorbent material for lining a lateral passageway connected to a main passageway, comprising:
   a lining tube of resin absorbable flexible material formed with a lumen conforming to the dimensions of the lateral having a collar consisting essentially of a resin absorbable flexible material adapted to conform to the interior surface of the main passageway around the lateral aperture for forming an improved seal at the junction between the main pipeline and the lateral, wherein the tube and the collar are both resin impregnable.

* * * * *

UNITED STATES PATENT AND TRADEMARK OFFICE
CERTIFICATE OF CORRECTION

Page 1 of 1

PATENT NO. : 6,337,114 B1
APPLICATION NO. : 08/941605
DATED : January 8, 2002
INVENTOR(S) : Eric Wood It is certified that error appears in the above-identified patent and that said Letters Patent is hereby corrected as shown below:

Title page, item [62] Related U.S. Application Data; "on Sep. 10, 1992" should read --as application No. PCT/GB91/00628, filed on Apr. 22, 1991--.

Signed and Sealed this
Fifth Day of July, 2011

David J. Kappos
*Director of the United States Patent and Trademark Office*

(12) EX PARTE REEXAMINATION CERTIFICATE (7874th)
United States Patent
Wood et al.

(10) Number: US 6,337,114 C1
(45) Certificate Issued: Nov. 16, 2010

(54) FLEXIBLE LINING WITH FLEXIBLE COLLAR FOR LINING LATERAL PIPELINES

(75) Inventors: Eric Wood, Castletown (GB); Miranda Jane Bull, legal representative, Peel (GB)

(73) Assignee: INA Acquisition Corp., Wilmington, DE (US)

Reexamination Request:
No. 90/010,358, Dec. 16, 2008

Reexamination Certificate for:
Patent No.: 6,337,114
Issued: Jan. 8, 2002
Appl. No.: 08/941,605
Filed: Sep. 30, 1997

Related U.S. Application Data

(62) Division of application No. 08/599,045, filed on Feb. 9, 1996, now Pat. No. 5,975,878, which is a division of application No. 08/394,622, filed on Feb. 27, 1995, now Pat. No. 5,624,629, which is a continuation of application No. 07/934,678, filed on Sep. 10, 1992, now Pat. No. 5,393,481.

(51) Int. Cl.
  *F16L 55/179* (2006.01)
  *F16L 55/165* (2006.01)
  *F16L 55/16* (2006.01)
  *F16L 55/26* (2006.01)
  *F16L 55/162* (2006.01)

(52) U.S. Cl. ............................ 428/36.9; 138/97; 138/98; 156/294

(58) Field of Classification Search ........................ None
See application file for complete search history.

(56) References Cited

U.S. PATENT DOCUMENTS

| | | | |
|---|---|---|---|
| 3,773,593 A | 11/1973 | Casadevall et al. | |
| 4,064,211 A | 12/1977 | Wood | |
| 4,135,958 A | 1/1979 | Wood | |
| 4,208,373 A | 6/1980 | Matovich | |
| 4,434,115 A | 2/1984 | Chick | |
| 4,439,469 A | 3/1984 | Wood | |
| 4,496,499 A | 1/1985 | Brittain et al. | |
| 4,581,247 A | 4/1986 | Wood | |
| 4,582,092 A | 4/1986 | Nissen | |
| 4,602,974 A | 7/1986 | Wood et al. | |
| 4,680,066 A | 7/1987 | Wood | |
| 4,724,108 A | 2/1988 | Jurgenlohmann et al. | |
| 4,778,553 A | 10/1988 | Wood | |
| 4,786,345 A | 11/1988 | Wood | |
| 4,887,848 A | 12/1989 | Burba | |
| 4,893,389 A | 1/1990 | Allen et al. | |
| 4,980,116 A | 12/1990 | Driver | |
| 4,991,006 A | 2/1991 | Wood | |
| 5,108,533 A | 4/1992 | Long, Jr. et al. | |
| 5,167,258 A | 12/1992 | Rice | |
| 5,167,901 A | 12/1992 | Driver et al. | |
| 5,199,463 A | 4/1993 | Lippiatt | |

(Continued)

FOREIGN PATENT DOCUMENTS

| | | |
|---|---|---|
| AT | 402 550 B | 6/1997 |
| CA | 2045689 | 6/1991 |
| DE | 254055 | 2/1912 |

(Continued)

OTHER PUBLICATIONS

Top Hat Cosmic™ Lateral Connection Sealing System. Brochure. Bates No. AMerik 65–76.

(Continued)

*Primary Examiner*—Terrence R Till

(57) ABSTRACT

A flexible liner resin impregnable for lining a lateral pipe which leads into a main pipe having at one end a flexible collar for installation at the location where the lateral liner meets the main, wherein after installation the collar extends along the interior of the main seating against the opening of the lateral. The flexible liner is installed by everting the liner through the opening in the collar by means of fluid under pressure supplied to a launching device which is held in position by an inflatable bladder and seals the collar at the lateral main pipe junction.

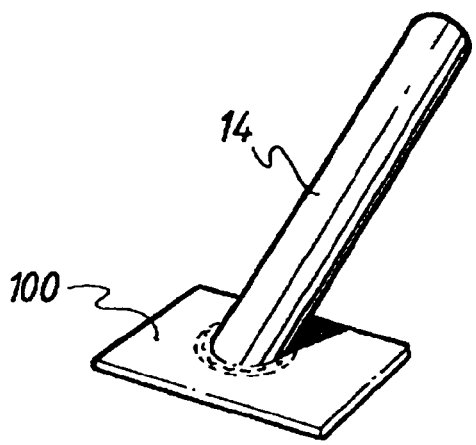

U.S. PATENT DOCUMENTS

| | | | |
|---|---|---|---|
| 5,223,189 | A | 6/1993 | Friedrich |
| 5,329,063 | A | 7/1994 | Endoh |
| 5,384,086 | A | 1/1995 | Smith |
| 5,454,401 | A | 10/1995 | Kamiyama et al. |
| 5,609,439 | A | 3/1997 | Schreiner et al. |
| 5,624,629 | A | 4/1997 | Wood |
| 5,692,543 | A | 12/1997 | Wood |
| 5,915,419 | A | 6/1999 | Tweedie et al. |
| 5,927,341 | A | 7/1999 | Taylor |
| 5,975,878 | A | 11/1999 | Wood et al. |
| 6,029,726 | A | 2/2000 | Tweedie et al. |
| 6,068,725 | A | 5/2000 | Tweedie et al. |
| 6,227,764 | B1 | 5/2001 | Einhaus et al. |
| 6,337,114 | B1 | 1/2002 | Wood et al. |
| 6,899,832 | B2 | 5/2005 | Wood |
| 2003/0168161 | A1 | 9/2003 | Wood |

FOREIGN PATENT DOCUMENTS

| | | |
|---|---|---|
| DE | 89 11 617 | 12/1989 |
| DE | 3929558 A1 | 3/1991 |
| DE | 40 31 919 A1 | 4/1992 |
| EP | 0 335 223 | 8/1990 |
| EP | 0 241 719 | 7/1991 |
| GB | 1 449 455 | 9/1976 |
| GB | 2 041 147 A | 9/1980 |
| GB | 2 082 285 | 3/1982 |
| GB | 2 094 862 | 9/1982 |
| GB | 2 096 265 | 10/1982 |
| GB | 2 147 966 | 5/1985 |
| GB | 9009073 | 6/1990 |
| GB | 9319832 | 7/1999 |
| JP | 60-120034 S | 6/1985 |
| JP | 60-139373 | 7/1985 |
| JP | 60-242038 | 12/1985 |
| JP | 62-016127 | 1/1987 |
| JP | S62-132632 | 6/1987 |
| JP | 62-135343 | 6/1987 |
| JP | 62 135344 | 6/1987 |
| JP | S63-167193 | 7/1988 |
| JP | 63-286325 | 11/1988 |
| JP | 64-58525 | 3/1989 |
| JP | 01-184122 | 7/1989 |
| JP | 01-188325 | 7/1989 |
| JP | 01-192524 | 8/1989 |
| JP | 01-258938 | 10/1989 |
| JP | 02-103124 | 8/1990 |
| JP | 02-239920 | 9/1990 |
| JP | 02-127026 | 10/1990 |
| JP | 03-161320 | 7/1991 |
| JP | 03-130130 | 12/1991 |
| JP | 4-355116 | 9/1992 |
| JP | 63-254025 | 10/1998 |
| WO | WO 85/03758 | 8/1985 |
| WO | WO 89/08218 | 9/1989 |
| WO | WO 91/07619 A1 | 5/1991 |
| WO | WO 91/16568 | 10/1991 |
| WO | WO 95/08737 | 3/1995 |

OTHER PUBLICATIONS

Cosmic–Sondermaschinenbau Ges. M. B. H. DSM–BASF Structural Resins Product Data Palatal P 92 I–02. Product Specifications. Bates No. AMerik 83: May 14, 2001.

Owens Corning. Advantex® Glass Fiber. Website printout. http://www.owenscorner.com/composites/new/table. Html. Bates No. AMerik 84–85. May 14, 2001.

Owens Corning. Advantex® Glass Fiber. Brochure. Bates No. AMerik 86. May 14, 2001.

Comsic Sondermaschinenbau. Top Hat™ Lateral Sealing System. Brochure. Bates No. AMerik 183–184.

Amerik Supplies, Inc. Top Hat™ Lateral Sealing System. Brochure. Bates No. AMerik 193–194.

Southwest Pipline and Trenchless Corp. Top Hat™ and Lateral Lining Installations as of Oct. 2007. Pamphlet. Bates No. AMerik 281–284. Oct. 2007.

Pomer, John. Trenchless Technology Used to Ensure Longevity of Sewer Rehabilitation Project in San Diego. Article. *Public Works Department Newsletter*, League of California Cities, Sacramento CA. Winter 2003. Bates No. AMerik 285.

Rush, James. San Diego Utilizes UV–Cured Robotic Lateral Sealing System. Article. *Trenchless Technology*. Jan. 2002. Bates No. AMerik 286.

Schantz, Dick. Pinetops, N.C., Complete Sewer System Overhaul. Article. *Trenchless Technology*. Nov. 2004. Bates No. AMerik 287–288.

Amerik Supplies, Inc. Top Hat™ Fiberglass Lateral Seal Installation Specifications. Specifications. Bates No. AMerik 528–529.

Americk Supplies, Inc. Top Hat™ Lateral Sealing System. Brochure/Photos. Bates No. AMerik 530–532.

Comsic Sondermaschinenbau GmbH. Cosmic Drain Renovation & Repair Techniques. Brochure. Bates No. AMerik 533–540.

*Trenchless Technology*, AMerik Supplies. Brochure Cover. Bates No. SWP 1.

Rush, James. AMerik Supplies: Founded on a Lifetime of Experience. Article. *Trenchless Technology*, Jan. 2003. www.trenchlessonline.com. Bates No. SWP 2–5.

Nielsen, Erik: Scarrat, Chris. Lateral Sealing and Lining. Presentation Outline. AMerik Supplies, Inc. May 8, 2005. Bates No. SWP 10–15.

Specification for Top Hat™ Lateral Connection Sealing and Repair Product in Relined or Unlined Sewer Main (010505) Outline of Specifications. May 8, 2005. Bates No. SWP–6–9.

Quality Trenchless Technology. Brochure. Bates No. SWP 16.

Comsic Sondermaschinenbau GmbH. Top Hat™ Cosmic Lateral Connection Sealing System. Repairs without the need for excavation. Brochure. Bates No. SWP 17–22.

Southwest Pipline and Trenchless Corp. Top Hat Systems™ Fiberglass Lateral Seal Installation Specifications; Characteristics of the Top Hat™ Lateral Seal Laminates. Brochure. Bates No. SWP 24–26.

Cosmic: Top Hat Crawler Attachments. Brochure. Bates No. SWP 23.

Southwest Pipline and Trenchless Corp. Top Hat Systems™ Lateral Connection Sealing Systems: The first system in the industry to offer a permanent lateral seal in relined pipelines. Brochure.

Southwest Pipline and Trenchless Corp. Introduction to the Top Hat System™. Brochure. Bates No. SWP 54–79. Jun. 2001.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

New claims 5 and 6 are added and determined to be patentable.

Added claim 7 was cancelled.

*5. A liner of resin absorbent material for lining a lateral passageway connected to a main passageway, comprising:*

*a lining tube of resin absorbable flexible material formed with a lumen conforming to the dimensions of the lateral having a collar of resin absorbable flexible material having a central opening and being adapted to conform to the interior surface of the main passageway around the lateral aperture for forming an improved seal at the junction between the main pipeline and the lateral, wherein the tube and the collar are both resin impregnable, and wherein the lining tube is adapted to be everted through the central opening of the collar into the lateral passageway.*

*6. A liner of resin absorbent material for lining a lateral passageway connected to a main passageway, comprising:*

*a lining tube of resin absorbable flexible material formed with a lumen conforming to the dimensions of the lateral having a collar of resin absorbable flexible material extending continuously around the lining tube adapted to conform to the interior surface of the main passageway around the lateral aperture for forming an improved seal with the continuous collar at the junction between the main pipeline and the lateral, wherein the tube and the collar are both resin impregnable.*

\* \* \* \* \*

(12) EX PARTE REEXAMINATION CERTIFICATE (8764th)
United States Patent
Wood et al.

(10) Number: US 6,337,114 C2
(45) Certificate Issued: *Dec. 13, 2011

(54) FLEXIBLE LINING WITH FLEXIBLE COLLAR FOR LINING LATERAL PIPELINES

(75) Inventors: Eric Wood, Castletown (GB); Miranda Jane Bull, legal representative, Peel (GB)

(73) Assignee: INA Acquisition Corp., Wilmington, DE (US)

Reexamination Request:
No. 90/009,851, Nov. 17, 2010

Reexamination Certificate for:
Patent No.: 6,337,114
Issued: Jan. 8, 2002
Appl. No.: 08/941,605
Filed: Sep. 30, 1997

Reexamination Certificate C1 6,337,114 issued Nov. 16, 2010

(*) Notice: This patent is subject to a terminal disclaimer.

Certificate of Correction issued Jul. 5, 2011.

Related U.S. Application Data

(62) Division of application No. 08/599,045, filed on Feb. 9, 1996, now Pat. No. 5,975,878, which is a division of application No. 08/394,622, filed on Feb. 27, 1995, now Pat. No. 5,624,629, which is a continuation of application No. 07/934,678, filed as application No. PCT/GB91/00628 on Apr. 22, 1991.

(51) Int. Cl.
| | |
|---|---|
| F16L 55/16 | (2006.01) |
| F16L 55/26 | (2006.01) |
| F16L 55/165 | (2006.01) |
| F16L 55/179 | (2006.01) |
| F16L 55/162 | (2006.01) |

(52) U.S. Cl. .......................... 428/36.9; 138/97; 138/98; 156/294

(58) Field of Classification Search .................. None
See application file for complete search history.

(56) References Cited

To view the complete listing of prior art documents cited during the proceeding for Reexamination Control Number 90/009,851, please refer to the USPTO's public Patent Application Information Retrieval (PAIR) system under the Display References tab.

*Primary Examiner*—Terrence Till

(57) ABSTRACT

A flexible liner resin impregnable for lining a lateral pipe which leads into a main pipe having at one end a flexible collar for installation at the location where the lateral liner meets the main, wherein after installation the collar extends along the interior of the main seating against the opening of the lateral. The flexible liner is installed by everting the liner through the opening in the collar by means of fluid under pressure supplied to a launching device which is held in position by an inflatable bladder and seals the collar at the lateral main pipe junction.

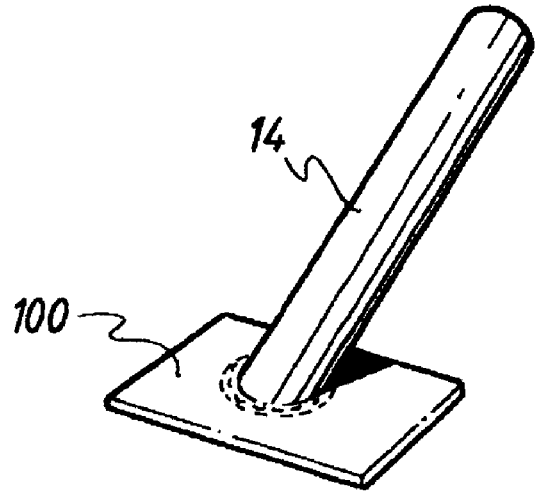

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *